(12) United States Patent
Yang

(10) Patent No.: US 10,788,869 B2
(45) Date of Patent: Sep. 29, 2020

(54) HEAT-CONDUCTING CASE UNIT FOR HANDHELD ELECTRONIC DEVICE

(71) Applicant: ASIA VITAL COMPONENTS CO., LTD., New Taipei (TW)

(72) Inventor: Hsiu-Wei Yang, New Taipei (TW)

(73) Assignee: Asia Vital Components Co., ltd., New Taipei (TW)

( * ) Notice: Subject to any disclaimer, the term of this patent is extended or adjusted under 35 U.S.C. 154(b) by 0 days.

(21) Appl. No.: 16/033,172

(22) Filed: Jul. 11, 2018

(65) Prior Publication Data
US 2018/0321717 A1    Nov. 8, 2018

Related U.S. Application Data

(63) Continuation-in-part of application No. 14/103,000, filed on Dec. 11, 2013, now Pat. No. 10,101,779.

(51) Int. Cl.
*G06F 1/20*     (2006.01)
*F28F 21/04*    (2006.01)

(52) U.S. Cl.
CPC .............. *G06F 1/203* (2013.01); *F28F 21/04* (2013.01)

(58) Field of Classification Search
CPC ........... H01L 23/373; G06F 1/20; G06F 1/203
USPC ............................................. 361/679.54, 702
See application file for complete search history.

(56) References Cited

U.S. PATENT DOCUMENTS

| | | | |
|---|---|---|---|
| 6,487,073 B2 | 11/2002 | McCullough et al. | |
| 7,768,457 B2 * | 8/2010 | Pettus | H01L 23/66 343/700 MS |
| 7,778,044 B2 * | 8/2010 | Inaba | H03J 1/00 174/520 |
| 8,270,170 B2 * | 9/2012 | Hughes | H05K 7/20445 165/104.33 |
| 8,481,126 B2 * | 7/2013 | Wang | B32B 15/04 427/190 |
| 2007/0127223 A1 | 6/2007 | Mitsuhashi | |
| 2008/0151503 A1 * | 6/2008 | Aapro | H04M 1/026 361/714 |
| 2011/0174474 A1 | 7/2011 | Chung et al. | |
| 2014/0126135 A1 | 5/2014 | Abbatiello et al. | |
| 2014/0168898 A1 * | 6/2014 | Xu | H01L 23/3731 361/705 |

(Continued)

FOREIGN PATENT DOCUMENTS

CN    2847531 Y    12/2006
CN    101652020 A    2/2010

(Continued)

*Primary Examiner* — Mukundbhai G Patel
(74) *Attorney, Agent, or Firm* — Thomas J. Nikolai; DeWitt LLP

(57) ABSTRACT

A heat-conducting case unit for handheld electronic device includes a ceramic back cover having an outer surface and an inner surface. The inner surface faces a receiving space of the handheld electronic device and has a heat conducting element provided thereon to contact with at least one heat source in the receiving space, and the heat conducting element has a thermal conductivity higher than that of the ceramic back cover. The outer surface is exposed to an external environment. Heat produced by the heat source is transferred via the heat conducting element to the ceramic back cover, from where the produced heat is dissipated into the external environment.

2 Claims, 5 Drawing Sheets

(56) References Cited

U.S. PATENT DOCUMENTS

2014/0240921 A1* 8/2014 Sultenfuss ............ G06F 1/1656
361/679.54
2015/0016062 A1* 1/2015 Robert ................. H05K 7/2029
361/700

FOREIGN PATENT DOCUMENTS

| CN | 101742878 A | 6/2010 |
| --- | --- | --- |
| CN | 201888066 U | 6/2011 |
| CN | 202025795 U | 11/2011 |
| TW | 201248110 A1 | 12/2012 |
| TW | 201309991 A1 | 3/2013 |
| TW | 201322874 A1 | 6/2013 |

\* cited by examiner

HEAT-CONDUCTING CASE UNIT FOR HANDHELD ELECTRONIC DEVICE

The present application is a continuation in part of U.S. patent application Ser. No. 14/103,000, filed on Dec. 11, 2013.

FIELD OF THE INVENTION

The present invention relates to the field of heat dissipation, and more particularly, to a heat-conducting case unit for handheld electronic device.

BACKGROUND OF THE INVENTION

A handheld electronic device is an electronic device that can be conveniently carried with and operated by a user. With the constantly increased high integration of internal electronic elements thereof, the currently available electronic devices all are very compact to have further reduced volume and weight. However, the reduction of electronic device dimensions also brings the problem of poor heat dissipation, which confuses product designers very much. And, this problem is even more serious in the field of handheld electronic devices.

Generally, most of the handheld electronic devices available in the market have a plastic case. Heat produced by the electronic elements in the volume-reduced handheld electronic devices could not be easily dissipated via the plastic cases to thereby cause difficulties in heat removal from the handheld electronic devices. Therefore, the electronic elements inside the handheld electronic devices are subjected to overheating-caused failure and accordingly, shortened service life or lowered performance.

There are also handheld electronic device manufactures who produce the cases by using metal materials, particularly aluminum-magnesium alloys, which, due to their light weight, relatively high strength and attractive appearance, have already become the main case materials for the new generation of handheld electronic devices. However, while the aluminum-magnesium alloy cases have more attractive appearance than the plastic cases, they don't provide good heat dissipation effect either. As a result, the internal electronic elements of the handheld electronic devices with the aluminum-magnesium alloy case are still subjected to the problem of poor heat dissipation and shortened service life. Further, the aluminum-magnesium alloy cases would interfere with the antenna's signal receiving and transmission power and therefore could not satisfy the requirements for antenna designs.

SUMMARY OF THE INVENTION

A primary object of the present invention is to effectively solve the problems in the conventional cases for the handheld electronic devices by providing a heat-conducting case unit for handheld electronic device, so that heat accumulated in a handheld electronic device can be efficiently transferred via the heat-conducting case unit to an environment outside the handheld electronic device for dissipation.

Another object of the present invention is to provide a heat-conducting case unit for handheld electronic device, of which a ceramic back cover having a heat conducting element provided thereon forms a part of the case of the handheld electronic device. The ceramic back cover does not interfere with the signal receiving of an antenna design of the handheld electronic device while serving as means for dissipating heat accumulated in the handheld electronic device.

To achieve the above and other objects, the heat-conducting case unit for handheld electronic device according to the present invention includes a ceramic back cover having an outer surface and an inner surface. The inner surface faces a receiving space of the handheld electronic device and has a heat conducting element provided thereon to contact with at least one heat source in the receiving space. The heat conducting element has a thermal conductivity higher than that of the ceramic back cover, and is so arranged on the inner surface of the ceramic back cover at a position corresponding to the heat source that the heat conducting element overlaps with only a small area of the inner surface. The outer surface is exposed to an external environment. Heat produced by the heat source is transferred via the heat conducting element to the ceramic back cover, from where the produced heat is dissipated into the external environment.

The heat conducting element can be a graphite sheet, a vapor chamber, or a heat pipe.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
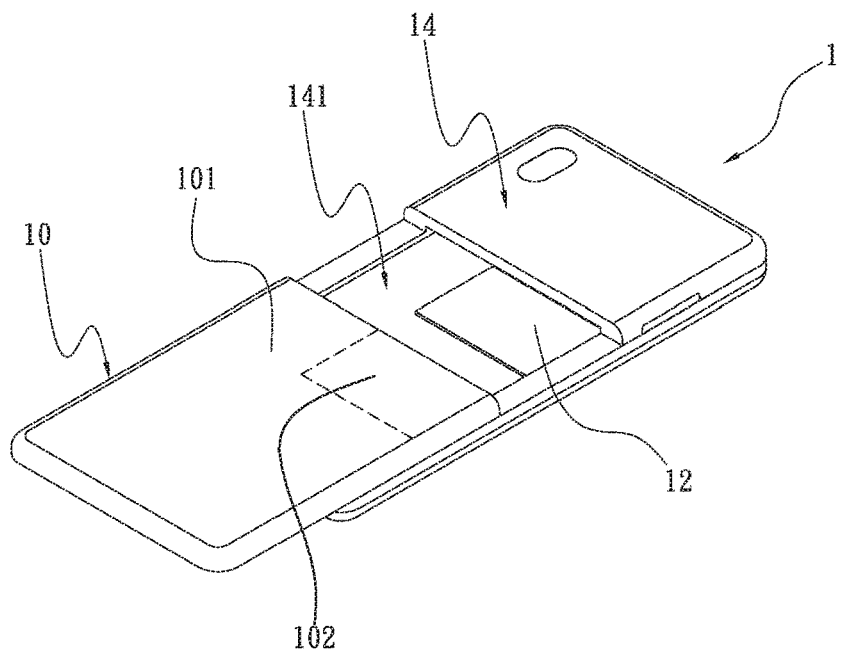
FIG. 1 is a partially exploded perspective view of a heat-conducting case unit according to a preferred embodiment of the present invention being used on a handheld electronic device.
Figure 2A:
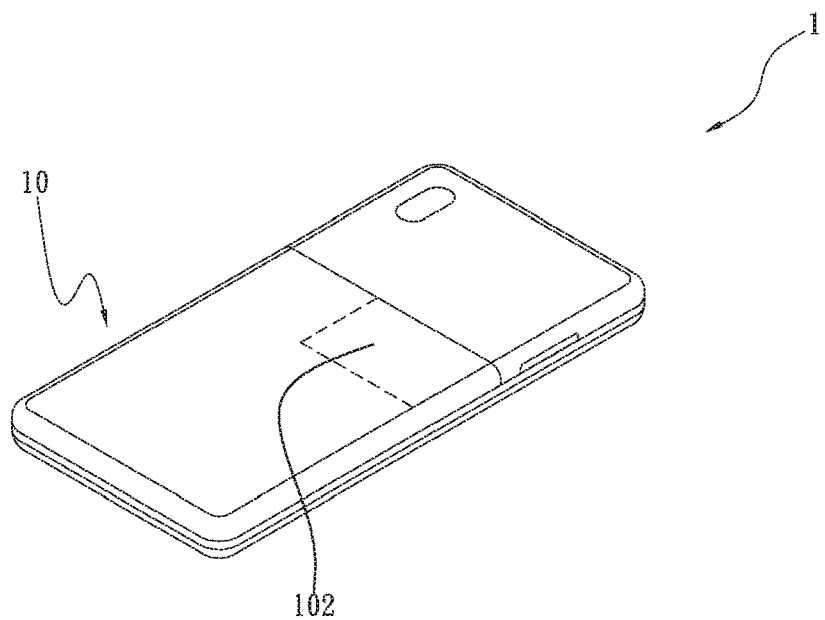
FIG. 2A is an assembled view of FIG. 1.
Figure 2B:
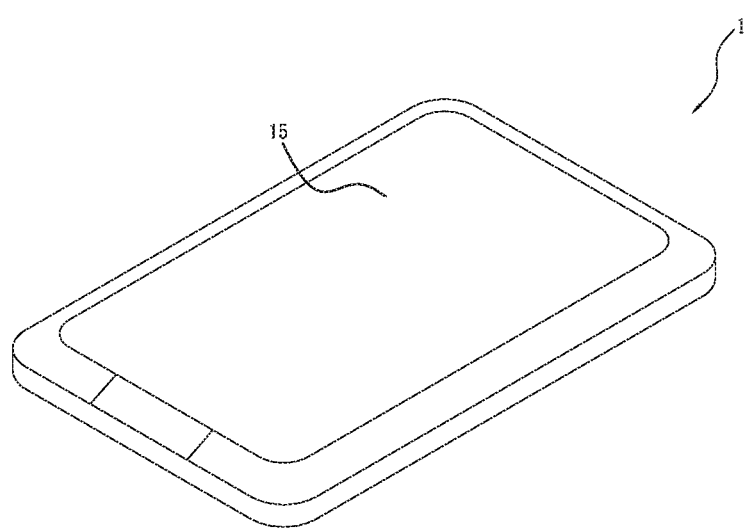
FIG. 2B shows the other side of the handheld electronic device shown in FIG. 2A.
Figure 3A:
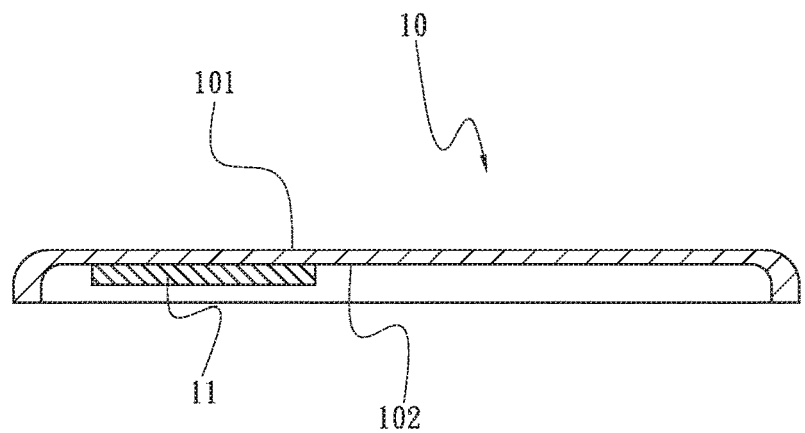
FIG. 3A is a sectional view of an embodiment of a ceramic back cover forming the heat-conducting case unit of the present invention.
Figure 3B:
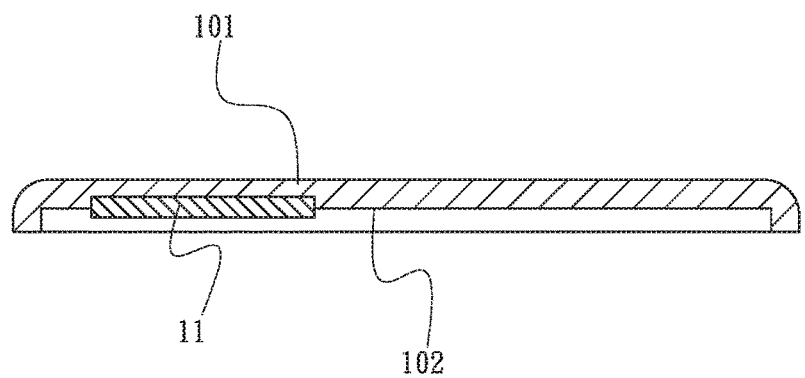
FIG. 3B is a sectional view of another embodiment of the ceramic back cover forming a part of the heat-conducting case unit of the present invention.
Figure 4:
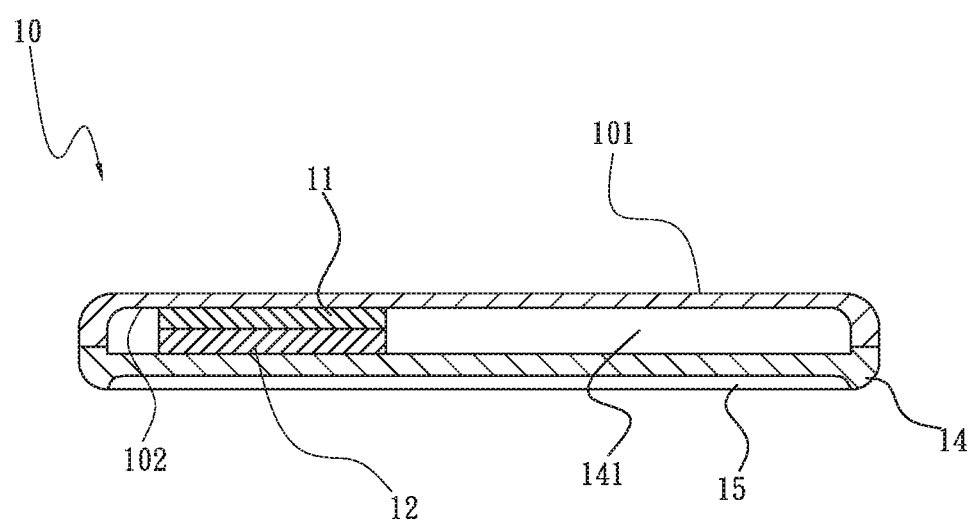
FIG. 4 is an assembled sectional view of FIG. 1.

The present invention will now be described with some preferred embodiments thereof and by referring to the accompanying drawings. For the purpose of easy to understand, elements that are the same in the preferred embodiments are denoted by the same reference numerals.

Please refer to FIGS. 1 to 4. A heat-conducting case unit for handheld electronic device according to the present invention includes a ceramic back cover 10 configured for assembling to a handheld electronic device 1, such as a cell phone or a tablet computer. The handheld electronic device 1 includes a front case 14, which has an inner side defining a receiving space 141 and an outer side having a screen 15 provided thereon. The screen 15 can be, for example, a touchscreen. The receiving space 141 has at least one open side, and has a circuit board, a battery and other components mounted therein. A heat source 12, which can be an electronic element, such as a central processing unit (CPU) or a micro control unit (MCU), mounted on the circuit board or can be a battery, is also located in the receiving space 141.

The ceramic back cover 10 can be made of a ceramic material, such as zirconium dioxide and/or aluminum oxide. The ceramic material is more resilient, wear-resistant and scratch-resistant. Another feature of the ceramic material is its stiffness, which allows the ceramic material to present in a very thin form without being easily bent. The ceramic material would not interfere with the antenna receiving power of the handheld electronic device 1 to satisfy the antenna design requirements for 2G to 4G or 5G or even more advanced generations of wireless systems. The ceramic back cover 10 has an outer surface 101 and an inner surface 102. The outer surface 101 is exposed to an external environment, and the inner surface 102 faces the receiving space 141 of the handheld electronic device 1. Further, the inner surface 102 is provided at a position corresponding to at least one heat source with a heat conducting element 11, which is in direct or indirect contact with the heat source 12 in the receiving space 141, so that heat produced by the heat source 12 is transferred via the heat conducting element 11 to the outer surface 101 of the ceramic back cover 10, from where the produced heat is dissipated into the external environment.

Preferably, the heat conducting element 11 has a thermal conductivity higher than that of the ceramic back cover 10 and is so arranged that it overlaps with the inner surface 102 of the ceramic back cover 10. In other words, the inner surface 102 of the ceramic back cover 10 has only a small area that is covered by the heat conducting element 11. Therefore, the arrangement of the heat conducting element 11 on the ceramic back cover 10 would not have any reverse influence on the design and the signal receiving power of an antenna structure of the handheld electronic device 1.

Further, the heat conducting element 11 is glue-bonded to and/or inlaid on the inner surface 102 of the ceramic back cover 10. In an alternative embodiment, the heat conducting element 11 has a main body that is in contact with the heat source 12, and the main body includes an extension section that is extended in a direction or to a position away from the heat source 12, so as to guide the heat produced by the heat source 12 to an area of the ceramic back cover 11 that has a relatively lower temperature than the heat source 12, in order to dissipate the produced heat.

Figure 5:
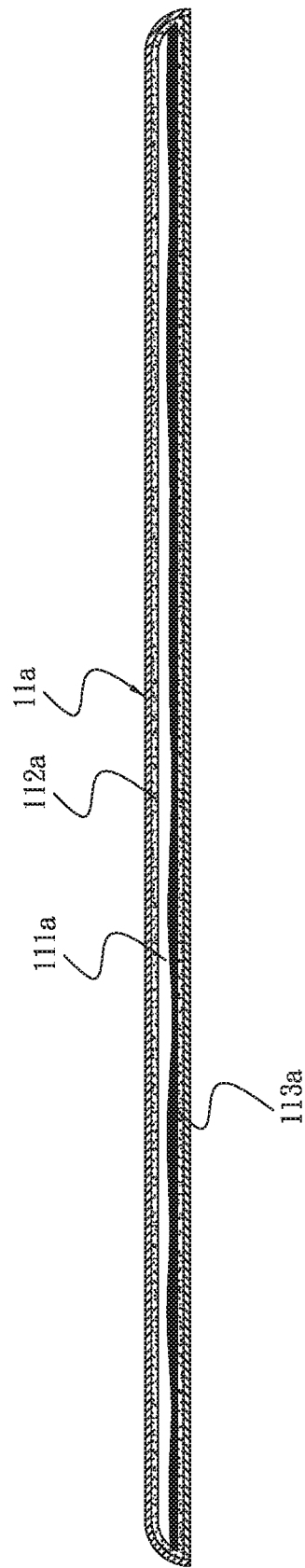
FIG. 5 is a sectional view of an embodiment of a heat conducting element forming a part of the heat-conducting case unit of the present invention.

An operable embodiment of the heat conducting element 11 can be, for example, a graphite sheet. However, as shown in FIG. 5, according to another embodiment thereof, the heat conducting element, which is otherwise denoted by reference numeral 11*a*, is in the form of a flat heat pipe or a vapor chamber defining a chamber 111*a* internally provided with a wick structure 112*a* and filled with a working fluid 113*a* to enable heat transfer through a vapor-liquid circulation in the flat heat pipe or the vapor chamber. Optionally, the heat pipe or the vapor chamber can be internally provided with supporting posts formed of a metal material or a wick structure.

Compared to the conventional cases for the handheld electronic devices, the heat-conducting case unit according to the present invention has the following advantages:

1. The use of a heat conducting element 11 having a thermal conductivity higher than that of the ceramic back cover 10 enables quicker transfer of the heat produced by the heat source 12 to an external environment;
2. The use of the heat-conducting case unit enables the handheld electronic device to have a longer service life; and
3. The ceramic back cover 10 has good resilience, wear resistance and scratch resistance, and can be present in a very thin form without being easily bent during use, and is therefore very suitable for applying to various types of mobile devices or ultra-thin mobile devices while satisfying the antenna design requirements for 2G to 4G or 5G or even more advanced generations of wireless systems.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A heat-conducting case unit for handheld electronic device, comprising:
   a ceramic back cover for assembling to a front case of the handheld electronic device, the front case defining a receiving space, the ceramic back cover having an outer surface and an inner surface; the inner surface facing toward the receiving space of the handheld electronic device and having a heat conducting element selected from the group consisting of a vapor chamber and a heat pipe provided thereon to contact with at least one heat source in the receiving space, and the heat conducting element having a thermal conductivity higher than that of the ceramic back cover; the outer surface being exposed to an external environment; and heat produced by the heat source being transferred via the heat conducting element to the ceramic back cover, from where the produced heat is dissipated into the external environment;
   wherein a predetermined area, less than an entire area of the inner surface corresponding to the at least one heat source, is bonded with the heat conducting element, so that the heat conducting element does not affect a signal receiving ability of the handheld electronic device.
2. The heat-conducting case unit for handheld electronic device as claimed in claim 1, wherein the heat conducting element is so arranged on the inner surface of the ceramic back cover at a position corresponding to the heat source that the heat conducting element overlaps with only a limited area of the inner surface of the ceramic back cover.

* * * * *